United States Patent
Baek et al.

(10) Patent No.: US 11,050,494 B2
(45) Date of Patent: Jun. 29, 2021

(54) SIGNAL-MULTIPLEXING APPARATUS AND METHOD BASED ON MACHINE LEARNING

(71) Applicant: ELECTRONICS AND TELECOMMUNICATIONS RESEARCH INSTITUTE, Daejeon (KR)

(72) Inventors: Myung-Sun Baek, Daejeon (KR); Joon-Young Jung, Daejeon (KR); Dong-Joon Choi, Daejeon (KR); Heung-Mook Kim, Daejeon (KR)

(73) Assignee: ELECTRONICS AND TELECOMMUNICATIONS RESEARCH INSTITUTE, Daejon (KR)

( * ) Notice: Subject to any disclaimer, the term of this patent is extended or adjusted under 35 U.S.C. 154(b) by 0 days.

(21) Appl. No.: 16/538,457

(22) Filed: Aug. 12, 2019

(65) Prior Publication Data

US 2020/0059306 A1     Feb. 20, 2020

(30) Foreign Application Priority Data

Aug. 17, 2018   (KR) .................. 10-2018-0096188
Aug. 17, 2018   (KR) .................. 10-2018-0096195
(Continued)

(51) Int. Cl.
*H04L 27/06*     (2006.01)
*H04B 17/14*     (2015.01)
(Continued)

(52) U.S. Cl.
CPC ........... *H04B 17/14* (2015.01); *H04B 7/0417* (2013.01); *H04B 7/0473* (2013.01); *H04B 7/0478* (2013.01)

(58) Field of Classification Search
CPC ........ H04L 27/04; H04B 17/10; H04B 1/0475
(Continued)

(56) References Cited

U.S. PATENT DOCUMENTS 5,272,723 A * 12/1993 Kimoto .................. G06N 3/04
                                                                  375/232
5,632,006 A *  5/1997 Peterson ............. G06N 3/0635
                                                                   706/38
(Continued)

FOREIGN PATENT DOCUMENTS

JP     6188106 B2     8/2017
KR   20180079050 A   7/2018
KR   20180066472 A   6/2019

OTHER PUBLICATIONS

Hao Ye et al., "Power of Deep Learning for Channel Estimation and Signal Detection in OFDM", IEEE Wireless Comm. Letters, vol. 7, No. 1, Feb. 2018, pp. 114-117.*

(Continued)

*Primary Examiner* — Tesfaldet Bocure

(57) ABSTRACT

Disclosed herein are a signal-multiplexing apparatus and method based on machine learning. The signal-multiplexing method based on machine learning, performed by a signal-multiplexing apparatus based on machine learning, including training a transmitted signal using a machine-learning technique, performing complex mapping to transmit the transmitted signal as multiple signals, receiving the multiple signals and regularizing the multiple signals based on a preset rule corresponding to the machine-learning technique, outputting an estimated value for the transmitted signal by training regularized multiple signals using the machine-learning technique, calculating a difference between the transmitted signal and the estimated value for the transmit- (Continued)

ted signal, and detecting the transmitted signal from an output value when the difference is less than or equal to a preset value.

16 Claims, 15 Drawing Sheets

(30) Foreign Application Priority Data

May 16, 2019 (KR) ........................ 10-2019-0057518
Jun. 4, 2019 (KR) ........................ 10-2019-0066213

(51) Int. Cl.
*H04B 7/0417* (2017.01)
*H04B 7/0456* (2017.01)

(58) Field of Classification Search
USPC ....... 375/285, 267, 219, 299, 296, 295, 316, 375/340, 347
See application file for complete search history.

(56) References Cited

U.S. PATENT DOCUMENTS

| | | |
|---|---|---|
| 9,853,700 B2 | 12/2017 | Hoshi et al. |
| 2009/0221316 A1* | 9/2009 | Chuang ................ G01S 5/0252 455/522 |
| 2015/0253747 A1 | 9/2015 | Chun et al. |
| 2016/0072543 A1* | 3/2016 | Abrishamkar ......... H04B 15/00 375/219 |
| 2016/0072590 A1* | 3/2016 | Tu ........................ H04B 1/525 455/63.1 |
| 2018/0103408 A1 | 4/2018 | Amini et al. |
| 2018/0189643 A1 | 7/2018 | Kim et al. |
| 2020/0143279 A1* | 5/2020 | West ...................... G06N 20/00 |

OTHER PUBLICATIONS

Syed Tajammul et al., "Radial basis function neural network non-linear equalizer for 16-QAM coherent optical OFDM", Nov. 15, 2015, IEEE PPhotonic Rechnology Letters, vol. 28, No. 22, pp. 2507-2510.*

Dalal Baroud et al., "A Study Towards Implementing Various Artificial Neural Networks for Signals Classification and Noise Detection in OFDM/PLC Channels," 2020 12th International Symposium on Communication Systems, Networks and Digital Signal Processing, 6 pages.*

* cited by examiner

| exp($\Re(y_1)$) | exp($\Im(y_1)$) | $\cdots$ | exp($\Re(y_R)$) | exp($\Im(y_R)$) |
|---|---|---|---|---|
| $Re_1(2)$ | $Im_1(2)$ | $\cdots$ | $Re_R(2)$ | $Im_R(2)$ |
| $Re_1(3)$ | $Im_1(3)$ | $\cdots$ | $Re_R(3)$ | $Im_R(3)$ |
| $Re_1(4)$ | $Im_1(4)$ | $\cdots$ | $Re_R(4)$ | $Im_R(4)$ |
| $Re_1(5)$ | $Im_1(5)$ | $\cdots$ | $Re_R(5)$ | $Im_R(5)$ |
| $Re_1(6)$ | $Im_1(6)$ | $\cdots$ | $Re_R(6)$ | $Im_R(6)$ |
| $\vdots$ | $\vdots$ | $\cdots$ | $\vdots$ | $\vdots$ |
| $Re_1(V+1)$ | $Im_1(V+1)$ | $\cdots$ | $Re_R(V+1)$ | $Im_R(V+1)$ |

Rx ANTENNA (columns), TIME (rows), K (row span)

FIG. 7

SIGNAL-MULTIPLEXING APPARATUS AND METHOD BASED ON MACHINE LEARNING

CROSS REFERENCE TO RELATED APPLICATIONS

This application claims the benefit of Korean Patent Application Nos. 10-2018-0096195, filed Aug. 17, 2018, 10-2018-0096188, filed Aug. 17, 2018, 10-2019-0057518, filed May 16, 2019, and 10-2019-0066213, filed Jun. 4, 2019, which are hereby incorporated by reference in their entireties into this application.

BACKGROUND OF THE INVENTION

1. Technical Field

The present invention relates generally to technology for transmitting/receiving multiple signals, and more particularly, to signal multiplexing technology based on machine learning.

2. Description of the Related Art

As simple methods for improving transfer rates in a communication environment, especially in a wireless communication environment, there are methods of widening a transmission bandwidth and methods of applying higher-order modulation. In the former case, the transfer rate may be increased in a very simple manner, but there is the problem of compatibility with existing schemes, and a decrease in network capacity attributable to a decrease in the number of available channels may occur. Also, in the latter case, several problems arise in that the transfer rate is not increased in proportion to the order of modulation, it is difficult to implement modulation as the modulation order increases, and coverage is decreased in order to satisfy the transfer rate. Further, it is possible to implement a scheme for utilizing high-performance channel code together with the use of higher-order modulation, but an excellent effect thereof cannot be expected.

Technology that is capable of greatly improving the transfer rate in this situation is a Spatial Division Multiplexing (SDM) technique using multiple antennas. SDM is a technique for obtaining a high data transfer rate by dividing serial data by the number of transmission antennas and simultaneously transmitting the pieces of data resulting from the division in parallel. Such SDM technology is advantageous in that a high data transfer rate may be obtained through parallel transmission, whereas there are disadvantages such as high complexity and deterioration of performance that occur during the procedure for separating and detecting pieces of data that are transmitted in parallel. In order to overcome these disadvantages, a lot of research into SDM signal detection has been conducted.

A conventional SDM signal detection method uses a Maximum Likelihood (ML) detection method, which is an optimal signal detection method, or uses an Ordered Successive Interference Cancelation (OSIC) detection method, which is a subtractive interference cancelation technique, so as to cancel interference. The ML detection method is a method of estimating a transmitted signal by deciding on the differences between a received signal and symbol combinations checked at a receiver through an ML test and by selecting the combination having the smallest difference from the received signal from among the symbol combinations. The ML method exhibits optimal detection performance because all symbol combinations that can be transmitted are checked and the optimal symbol combination is selected. However, when the number of transmission antennas is increased or when the modulation level of signals is raised, complexity may increase exponentially, thus resulting in a great detection delay in the actual system. Therefore, it is impossible in practice to use the ML method in a real-time transmission/reception system or in a multi-antenna system that uses a large number of antennas.

The OSIC detection method, which is a subtractive interference cancellation technique, arranges signals in descending order of received signal power, decides on the signal having the highest power, generates a transmitted signal by multiplying an estimated received signal by a channel parameter, and subtracts the generated transmitted signal from a previously received signal. The subtractive interference cancellation method is advantageous in that performance thereof is excellent and the structure thereof is simplified, but it is disadvantageous in that this method is a sequential subtractive detection method, and thus the accuracy of a first detected signal greatly influences the detection performance of the remaining signals, and in that there is a large difference in performance from the ML detection method, which is the optimal method, due to the influence of noise diffusion, thus greatly deteriorating transmission efficiency.

Furthermore, there are limitations in that both the ML method and the OSIC method must estimate multiple transmission/reception channels and demodulate signals through the estimated channel values.

Meanwhile, Korean Patent No. 10-2018-0066472, entitled "Method for Processing Music Signals Using Machine Learning", discloses a signal-processing method that uses machine learning.

SUMMARY OF THE INVENTION

Accordingly, the present invention has been made keeping in mind the above problems occurring in the prior art, and an object of the present invention is to more accurately detect a signal by utilizing a detection technique having high accuracy and to improve the performance of a wireless communication system by effectively cancelling signal interference, thus increasing the capacity of a system.

Another object of the present invention is to detect and demodulate a signal using a very simple calculation without requiring a channel estimation procedure.

A further object of the present invention is to modulate a signal in a format suitable for a multi-channel structure, effectively detect the corresponding signal, and effectively transmit/receive multiple signals through the same channel in order to simultaneously transmit/receive multiple signals.

In accordance with an aspect of the present invention to accomplish the above objects, there is provided a signal-multiplexing method based on machine learning, performed by a signal-multiplexing apparatus based on machine learning, including training a transmitted signal using a machine-learning technique; performing complex mapping to transmit the transmitted signal as multiple signals; receiving the multiple signals and regularizing the multiple signals based on a preset rule corresponding to the machine-learning technique; outputting an estimated value for the transmitted signal by training regularized multiple signals using the machine-learning technique; calculating a difference between the transmitted signal and the estimated value for the transmitted signal; and detecting the transmitted signal from an output value when the difference is less than or equal to a preset value.

Training the transmitted signal may be configured to receive an output value of encoding, which is bit encoding performed by assigning a bit at a position where a number of cases of signals capable of being transmitted is taken into consideration, and then train the output value as the transmitted signal.

Training the transmitted signal may be configured to perform training based on machine learning by inputting the output value of the encoding to a predefined function having nonlinear characteristics.

Performing the complex mapping may be configured to perform complex mapping by mapping a vector value of the transmitted signal to data having a real part and an imaginary part.

Performing the regularization may be configured to perform regularization so that each of the multiple signals is separated into a real part and an imaginary part.

Outputting the estimated value for the transmitted signal may be configured to estimate the transmitted signal by applying the machine-learning technique to a vector regularized so that the vector is separated into a real part and an imaginary part.

Calculating the difference may be configured to update a machine-learning coefficient of the machine-learning technique using results of calculation of the difference, train the transmitted signal using the machine-learning technique in which the machine-learning coefficient is updated, and estimate the transmitted signal.

Calculating the difference may be configured to, upon determining that the difference is less than or equal to the preset value, stop training and estimation of the transmitted signal and perform communication of the multiple signals.

In accordance with another aspect of the present invention to accomplish the above objects, there is provided a signal-multiplexing apparatus based on machine learning, including at least one processor; and an execution memory for storing at least one program that is executed by the at least one processor, wherein the at least one program is configured to train a transmitted signal using a machine-learning technique, perform complex mapping to transmit the transmitted signal as multiple signals, receive the multiple signals and regularize the multiple signals based on a preset rule corresponding to the machine-learning technique, output an estimated value for the transmitted signal by training the regularized multiple signals using the machine-learning technique, calculate a difference between the transmitted signal and the estimated value for the transmitted signal, and detect the transmitted signal from an output value when the difference is less than or equal to a preset value.

The at least one program may be configured to receive an output value of encoding, which is bit encoding performed by assigning a bit at a position where a number of cases of signals capable of being transmitted is taken into consideration, and then train the output value as the transmitted signal.

The at least one program may be configured to perform training based on machine learning by inputting the output value of the encoding to a predefined function having nonlinear characteristics.

The at least one program may be configured to perform complex mapping by mapping a vector value of the transmitted signal to data having a real part and an imaginary part.

The at least one program may be configured to perform regularization so that each of the multiple signals is separated into a real part and an imaginary part.

The at least one program may be configured to estimate the transmitted signal by applying the machine-learning technique to a vector regularized so that the vector is separated into a real part and an imaginary part.

The at least one program may be configured to update a machine-learning coefficient of the machine-learning technique using results of calculation of the difference, train the transmitted signal using the machine-learning technique in which the machine-learning coefficient is updated, and estimate the transmitted signal.

The at least one program may be configured to, upon determining that the difference is less than or equal to the preset value, stop training and estimation of the transmitted signal and perform communication of the multiple signals.

In accordance with a further aspect of the present invention to accomplish the above objects, there is a signal-multiplexing method based on machine learning, performed by a signal-multiplexing apparatus based on machine learning, including regularizing received signals based on a preset rule for machine learning; performing machine learning on regularized received signals and estimating a transmitted signal for the regularized received signals using machine-learned signals; and detecting the transmitted signal from the regularized received signals using an estimated value for the transmitted signal.

Regularizing the received signals may be configured to perform regularization so that each of the received signals is separated into a real part and an imaginary part.

Estimating the transmitted signal may be configured to arrange the received signals in a form of a matrix using a sort function for a neural-network architecture corresponding to any one of a fully-connected neural network technique, a convolutional neural network technique, and a recurrent neural network for machine learning.

Estimating the transmitted signal may be configured to arrange the regularized signals in a form of a matrix by grouping the regularized signals into a unit of signals received during a first preset time, and to estimate signals that are received during a second preset time corresponding to the first preset time.

BRIEF DESCRIPTION OF THE DRAWINGS

The above and other objects, features and advantages of the present invention will be more clearly understood from the following detailed description taken in conjunction with the accompanying drawings, in which:

FIG. 7 is a table illustrating a data arrangement structure for detecting a second transmitted signal in CNN-based MIMO detection technology according to an embodiment of the present invention;

DESCRIPTION OF THE PREFERRED EMBODIMENTS

Figure 1:
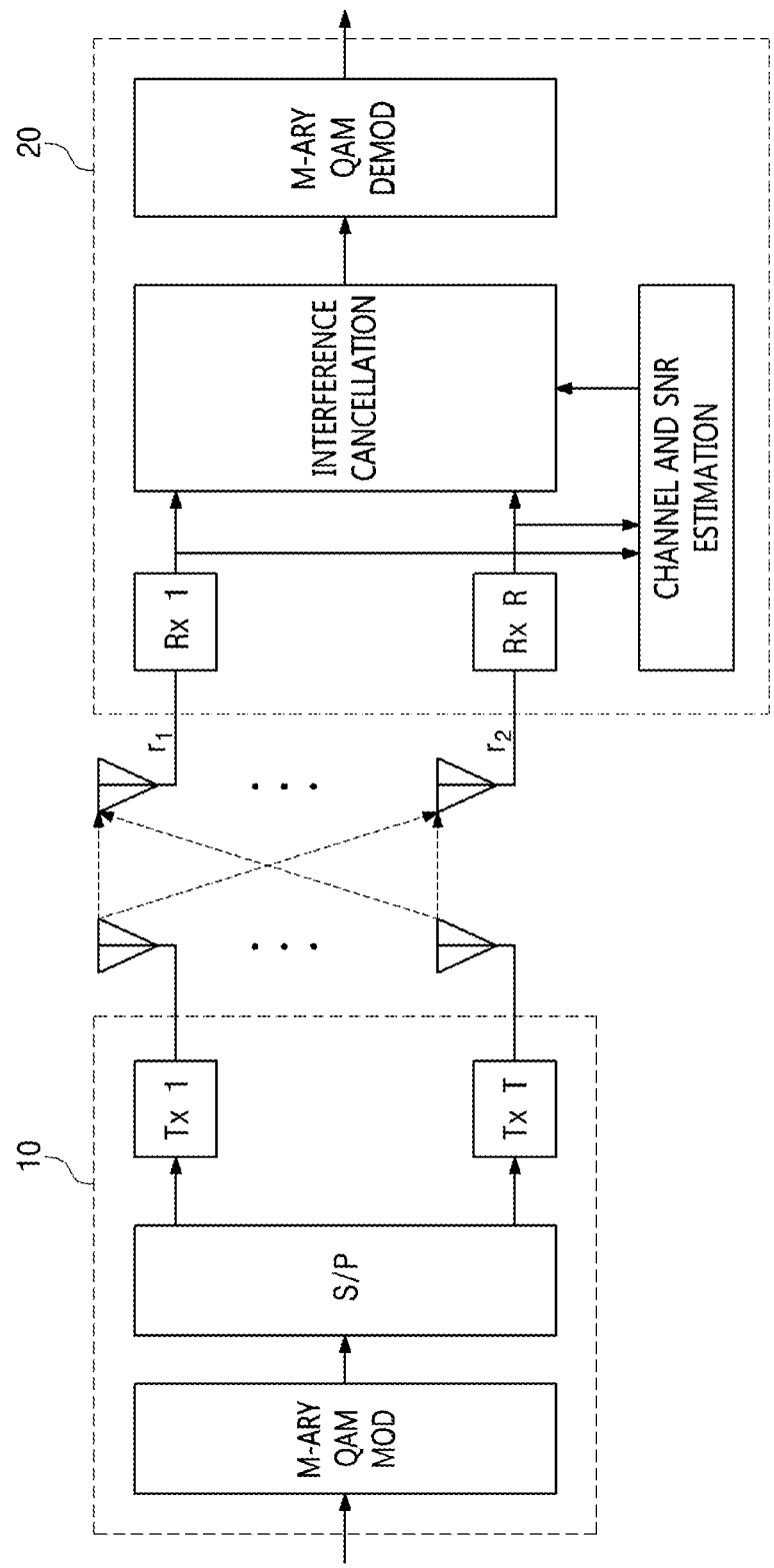
FIG. 1 is a block diagram illustrating a wireless communication system using multiple antennas according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

FIG. 1 is a block diagram illustrating a wireless communication system using multiple antennas according to an embodiment of the present invention.

Referring to FIG. 1, it can be seen that a transmission unit 10 transmits data to be transmitted through multiple antennas, and a reception unit 20 receives the data through multiple antennas.

As illustrated in FIG. 1, the transmission unit 10 may simultaneously transmit modulated signals through T transmission antennas. The signals transmitted through the T transmission antennas may be represented by the following Equation (1):

$$x = [x_1 x_2 x_3 \ldots x_T]^T \qquad (1)$$

The signal x transmitted as shown in Equation (1) may be an M-ary Quadrature Amplitude Modulated (M-QAM)-signal, as illustrated in FIG. 1, and may be represented by a complex number having a phase and an amplitude, such as a+bi. The signals independently transmitted through the T transmission antennas in this way are received through R reception antennas after passing through a multi-transmission/reception (Tx/Rx) channel, and may be represented by the following Equation (2):

$$y = \begin{bmatrix} y_1 \\ y_2 \\ \vdots \\ y_R \end{bmatrix} = \begin{bmatrix} h_{1,1} & h_{1,2} & \ldots & h_{1,T} \\ h_{2,1} & h_{2,2} & \ldots & h_{2,T} \\ \vdots & \vdots & \ddots & \vdots \\ h_{R,1} & h_{R,2} & \ldots & h_{R,T} \end{bmatrix} \cdot \begin{bmatrix} x_1 \\ x_2 \\ \vdots \\ x_T \end{bmatrix} + \begin{bmatrix} w_1 \\ w_2 \\ \vdots \\ w_R \end{bmatrix} \qquad (2)$$

where $h_{r,t}$ denotes a channel from a t-th transmission antenna to an r-th reception antenna, and $w_r$ denotes Gaussian noise (i.e. Additive White Gaussian Noise: AWGN) of the r-th reception antenna.

In a conventional ML or OSIC method, a procedure for estimating channel information is required in order to detect signals. Also, depending on the circumstances, a procedure for estimating a Signal-to-Noise Ratio (SNR) may also be required. The signals may be detected using the received signals, the channel information, and the SNR information in this way, but the present invention proposes machine-learning (deep learning)-based signal detection technology without estimating a channel or an SNR.

Figure 2:
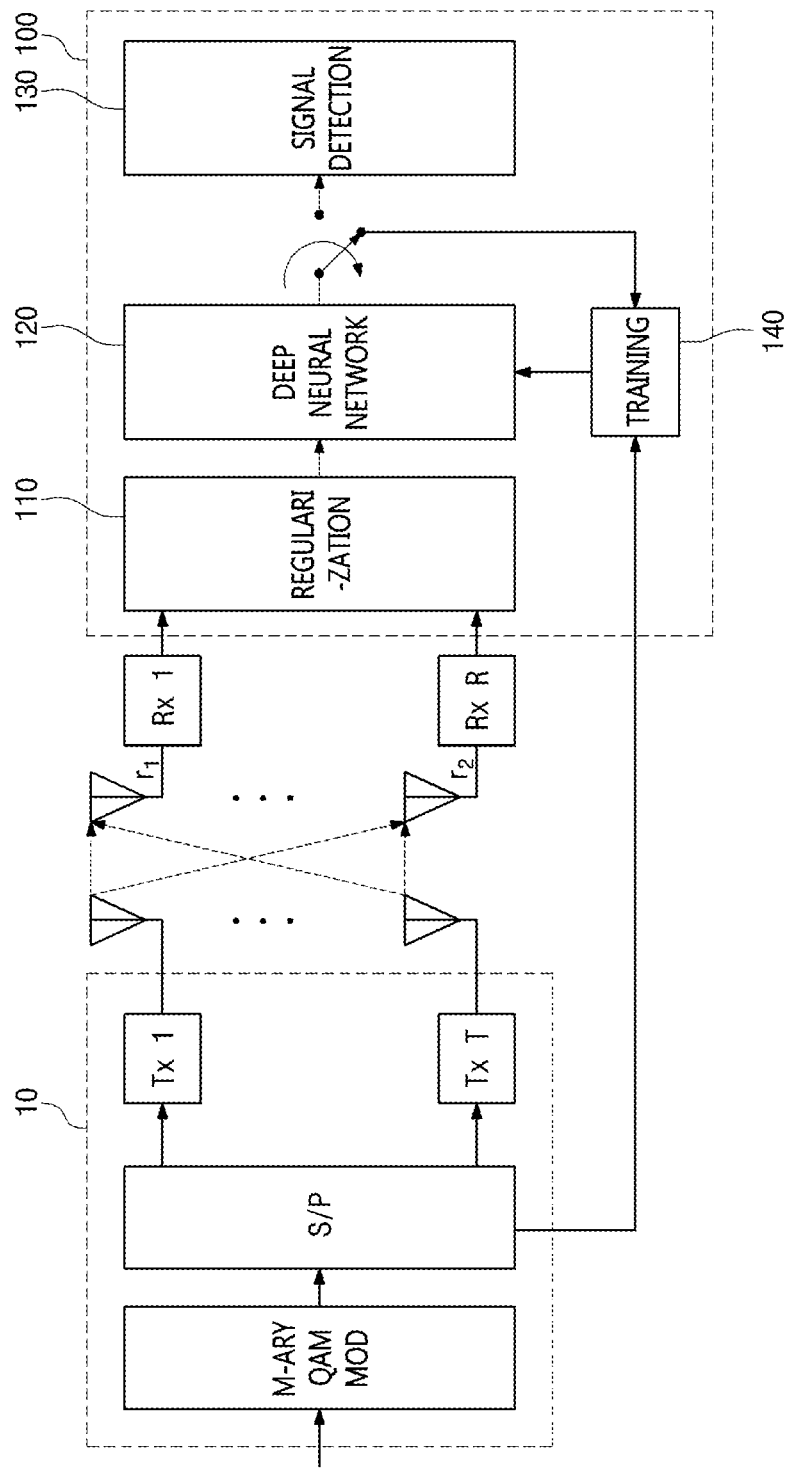
FIG. 2 is a block diagram illustrating a signal-multiplexing apparatus based on machine learning according to an embodiment of the present invention.

FIG. 2 is a block diagram illustrating a signal-multiplexing apparatus based on machine learning according to an embodiment of the present invention.

A signal-multiplexing apparatus 100 based on machine learning (hereinafter also referred to as a "machine learning-based signal-multiplexing apparatus 100") according to an embodiment of the present invention may include a regularization unit 110, a signal estimation unit (i.e. a deep neural network) 120, a signal detection unit 130, and a signal-training unit 140.

The machine learning-based signal-multiplexing apparatus 100 may receive the signals, transmitted through T transmission antennas, through R reception antennas, as shown in Equation (2) and FIG. 2.

The regularization unit 110 may regularize the received signals based on a preset rule for machine learning.

Here, the regularization unit 110 may regularize the received signals $y=[y_1 \ y_2 \ y_3 \ \ldots \ y_r]^T$ based on the specific rule in conformity with a machine-learning (deep-learning) structure.

Here, the regularization unit 110 may input the regularized received signals to the signal estimation unit 120 so as to perform signal detection.

Here, the regularization unit 110 may perform regularization on the received signals so that each received signal is separated into a real part and an imaginary part.

The signal estimation unit 120 may perform machine learning on the regularized received signals, and may estimate a transmitted signal corresponding to the regularized received signals using the machine-learned signals.

Here, the signal estimation unit 120 may correspond to a deep-learning block, and may perform training for machine learning-based deep-learning through the signal-training unit 140 by comparing transmitted and received signals during a specific period.

The signal estimation unit 120 may perform machine learning through the signal-training unit 140 using only the transmitted and received signals without requiring channel information or SNR information.

Here, the signal estimation unit 120 may use the regularized received signals as input signals for deep learning, and may use the transmitted signal as a reference value (e.g. a correct answer label) to be used for training.

Therefore, the signal estimation unit 120 needs to know the received signals and transmitted signal corresponding thereto for the training period. After training has been completed in this way, signals that the machine learning-based signal-multiplexing apparatus 100, which is the receiver, does not know may be input, and actual communication for estimating the transmitted signal may be performed. This step may be simply represented by the following Equation (3). The received signal y is input to a regularization function, so that regularization is performed in conformity with the deep-learning structure, and the regularized signal may be represented by the following Equation (3):

$$N_y = \mathbb{N}(y) \quad (3)$$

It can be seen that, in Equation 3, $N(\cdot)$ may be a regularization function. Here, regularized data may be input to the signal estimation unit 120, which is the deep-learning-based machine-learning block.

The data input to the signal estimation unit 120, which is the machine-learning block, may be output after undergoing a specific machine-learning operation. This procedure may be represented by the following Equation (4):

$$\hat{x} = F_\mu(N_y) \quad (4)$$

In Equation (4), $F_\mu(\cdot)$ denotes a deep-learning-based machine-learning function, which is briefly represented, and the coefficient of the function used at this time may be represented by $\mu$. Further, $\hat{x}$, which is the output signal, may be the signal estimated through the machine-learning procedure. The signal estimated as shown in Equation (4) may be compared with the signal transmitted during the training procedure by the signal estimation unit 120, so that an error value corresponding to the comparison may be calculated, and the error value may be gradually decreased through repetitive training.

Generally, such an error value is referred to as "cost or cost function attributable to training". By means of this, the signal estimation unit 120 may update $\mu$, which is the coefficient of the machine-learning function, and may stop training and perform actual communication if repetitive training corresponding to a specific number of repetitions has been completed, or if an error value less than or equal to a specific reference value is derived. Therefore, the output value of the deep-learning-based machine-learning function may be a value obtained by estimating the transmitted signal.

Here, the signal estimation unit 120 may arrange the received signals in the form of a matrix using a sort function for a neural network corresponding to any one of a fully-connected neural network technique, a convolutional neural network technique, and a recurrent neural network technique for machine learning.

The signal estimation unit 120 may arrange the regularized signals in the form of a matrix by grouping the regularized signals into a unit of signals received during a first preset time, and may estimate the signals received during a second preset time corresponding to the first preset time.

The signal detection unit 130 may detect the transmitted signal using estimated values.

That is, the signal detection unit 130 may detect the transmitted signal from the regularized received signals using the value obtained by estimating the transmitted signal.

Figure 3:
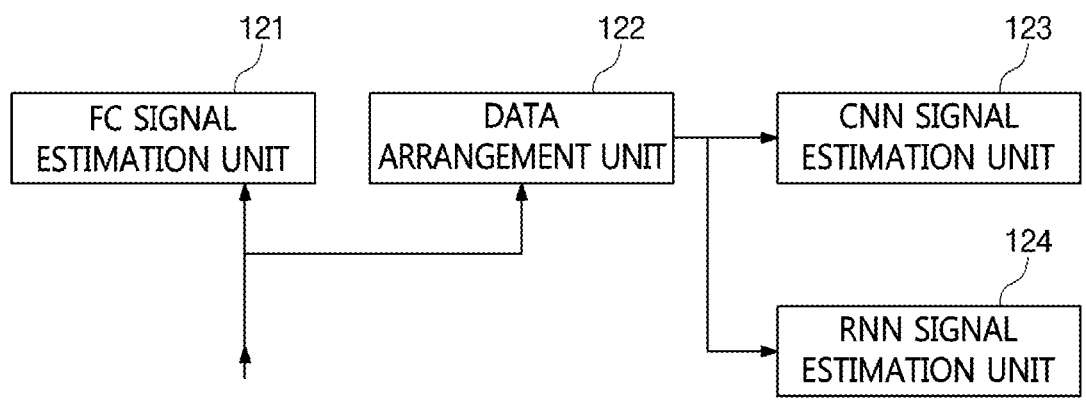
FIG. 3 is a diagram illustrating in detail an example of the signal estimation unit in the receiver of FIG. 2.

FIG. 3 is a diagram illustrating in detail an example of the signal estimation unit illustrated in FIG. 2.

Referring to FIG. 3, the signal estimation unit 120 may include an FC signal estimation unit 121, a data arrangement unit 122, a CNN signal estimation unit 123, and an RNN signal estimation unit 124.

The FC signal estimation unit 121 may perform Fully-Connected Network (FCN)-based signal estimation.

The CNN signal estimation unit 123 may perform Convolutional Neural Network (CNN)-based signal estimation.

The RNN signal estimation unit 124 may perform Recurrent Neural Network (RNN)-based signal estimation.

The data arrangement unit 122 may arrange the signals, which are received during a total of V time intervals, in the form of a V×2·R-dimensional matrix so that the received signals are suitable for a CNN architecture through an input signal sort function after regularization has been performed.

Also, the data arrangement unit 122 may arrange the signals, which are received during a total of V time intervals, in the form of a V×2·R-dimensional matrix so that the received signals are suitable for an RNN architecture through an input signal sort function after regularization has been performed.

Figure 4:
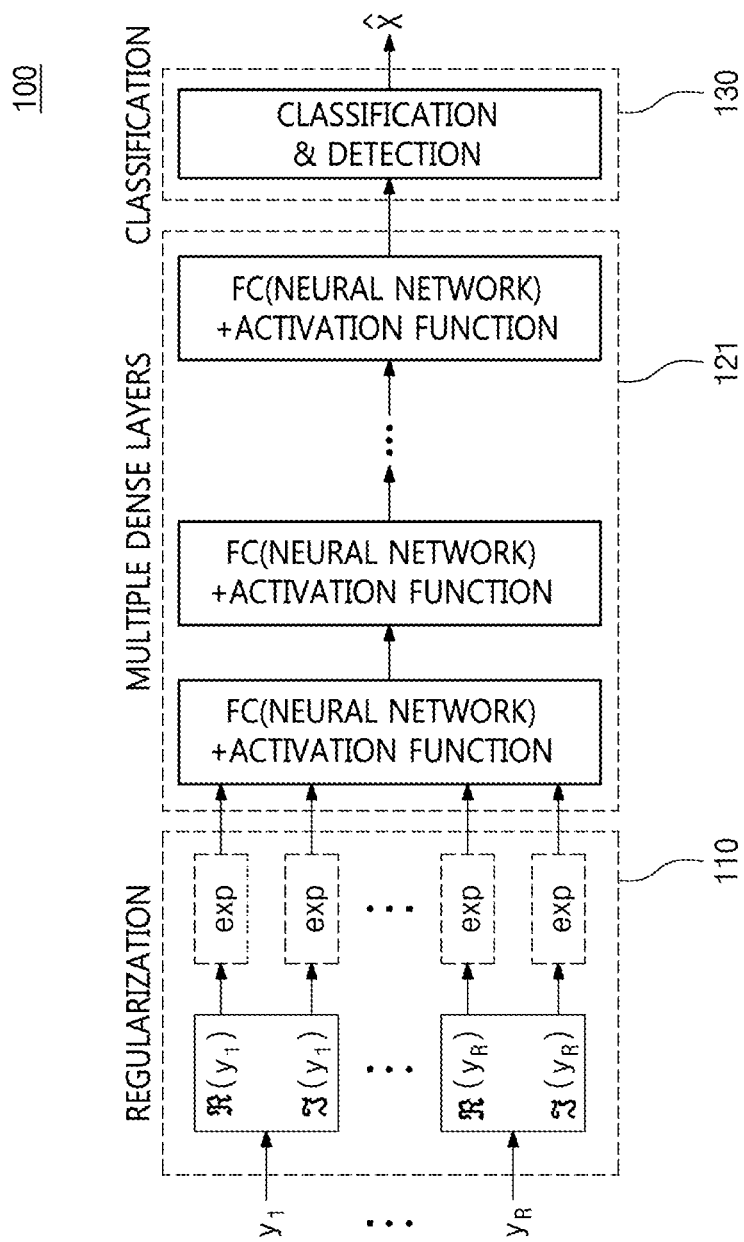
FIG. 4 is a block diagram illustrating a signal estimation unit for performing Fully-Connected Network (FCN)-based signal estimation according to an embodiment of the present invention.

FIG. 4 is a block diagram illustrating a signal estimation unit for performing Fully Connected Network (FCN)-based signal estimation according to an embodiment of the present invention.

Referring to FIG. 4, it can be seen that the most fundamental structure for cancelling interference from multiple machine-learned signals and detecting signals based on Deep Neural Network (DNN) is illustrated. As shown in Equation (2), regularization processing may be applied to signals that are received through R reception antennas.

DNN-based machine-learning functions are not suitable for complex or negative data processing. Therefore, the regularization unit 110 may separate all of received I/Q data-based complex signals into real parts and imaginary parts and then process all of the received signals as real numbers during a regularization process.

Thereafter, the regularization unit 110 may perform an exponential (exp) operation on the signals separated into real parts and imaginary parts in order to remove excessively large values or negative values.

However, the regularization unit 110 may skip the exponential operation depending on the structure or format of data.

The regularization operation performed by the regularization unit 110 may be represented by the following Equation (5):

$$Re_r = \exp(\Re(y_r))$$

$$Im_r = \exp(\Im(y_r))$$

$$N_y = [Re_1 Im_1 Re_2 Im_2 \ldots Re_R Im_R] \quad (5)$$

In Equation (5), $\Re(y_r)$ denotes the real part (value) of an r-th received signal $y_r$, and $\Im(y_r)$ denotes the imaginary part (value) of the r-th received signal $y_r$. As shown in Equation (5), a negative term is removed from the signal separated into the real part and the imaginary part through an exponential operation, and the resulting signal may be input to the signal estimation unit 120, which is a DNN block.

Here, the signal estimation unit 120 may perform DNN-based learning operations.

Here, an operation corresponding to each neuron of the signal estimation unit 120 may be represented by a Fully-Connected (FC) function, and an activation function operation may be performed so as to process the output of the neuron as a nonlinear function. As the activation function, any of various existing nonlinear functions for machine learning may be used. For example, as the activation function, any of existing functions, such as a Rectified Linear Unit (ReLU), tanh, and sigmoid, may be used.

The signal estimation unit 120 may calculate a cost, which is the difference between the output, derived through the signal estimation unit, and the transmitted value, by comparing the output with the transmitted value, and may perform training based on the value of the cost.

Here, the signal estimation unit 120 may perform training so that the differences for the coefficients of respective neurons are reduced.

Here, the signal estimation unit 120 may use any of a Mean Square Error (MSE) scheme and a cross entropy scheme so as to calculate the differences. In order to use the cross entropy scheme, it is easy to represent an output value in the form of a one-hot vector.

Also, the signal estimation unit 120 may train the transmission/reception system by updating the coefficient value using a typical Stochastic Gradient Descent (SGD) scheme or various modified schemes.

In the proposed DNN-based structure illustrated in FIG. 4, the regularization unit 110 may regulate R×1 signals corresponding to a single reception time interval to 2·R×1 signals, the FC signal estimation unit 121 of the signal estimation unit 120 may learn the regulated signals, and the signal detection unit 130 may detect the transmitted T×1-dimensional symbols. However, when the signals are received after passing through a multi-channel structure or when time/frequency offset occurs, previously transmitted symbols may continuously influence subsequently transmitted symbols. Therefore, when the transmitted signal is estimated in consideration of signals received during only a single reception time interval, accuracy may be decreased.

Figure 5:
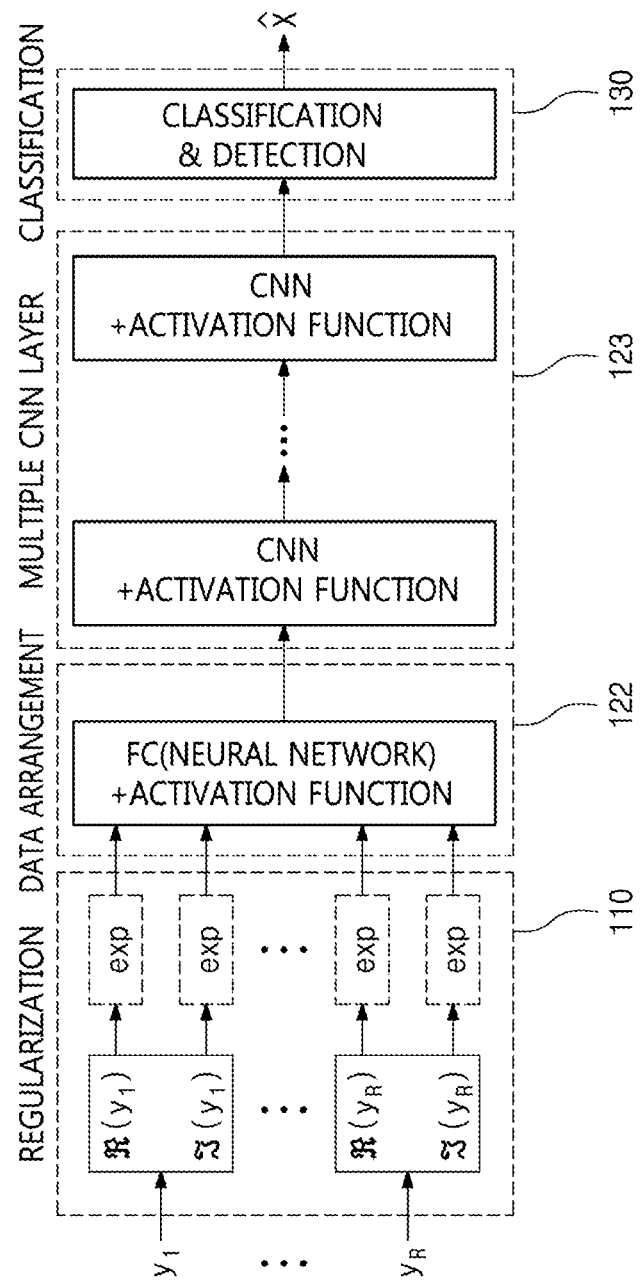
FIG. 5 is a block diagram illustrating a signal estimation unit for performing Convolutional Neural Network (CNN)-based signal estimation according to an embodiment of the present invention.
Figure 6:
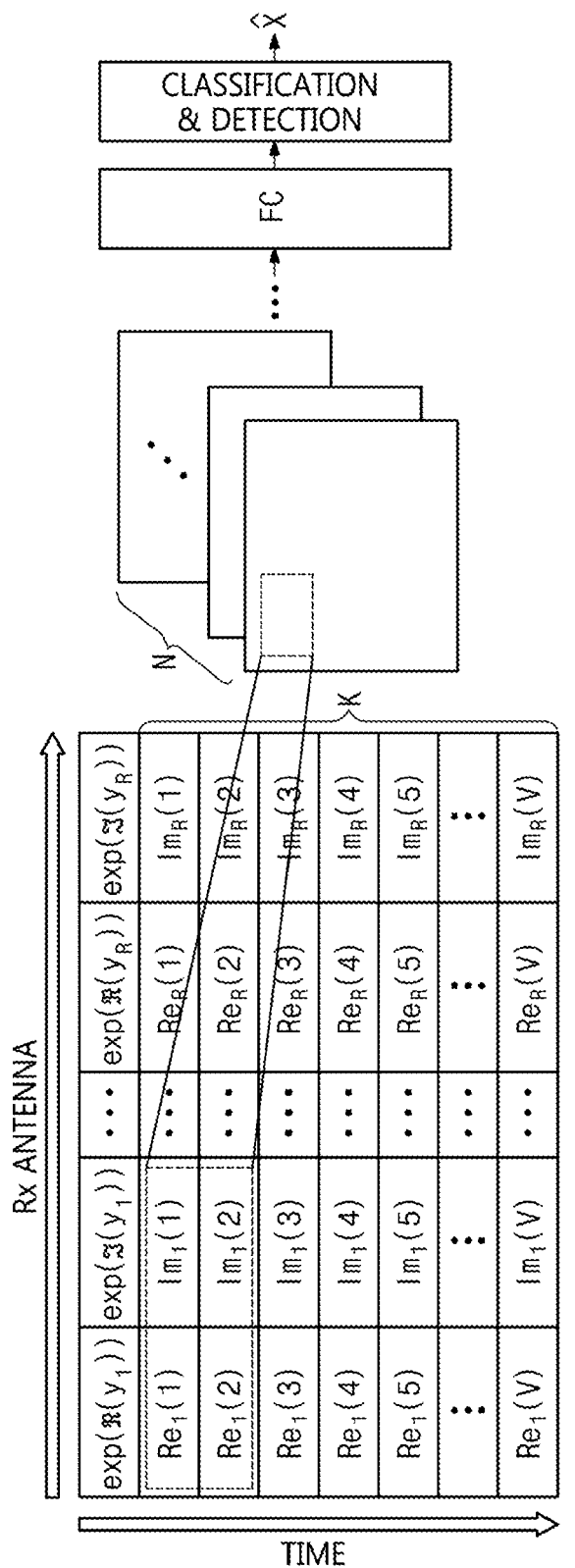
FIG. 6 is a diagram illustrating a data arrangement and signal detection process in CNN-based MIMO detection technology according to an embodiment of the present invention.

FIG. 5 is a block diagram illustrating a signal estimation unit for performing Convolutional Neural Network (CNN)-based signal estimation according to an embodiment of the present invention. FIG. 6 is a diagram illustrating a data arrangement and signal detection process in CNN-based MIMO detection technology according to an embodiment of the present invention. FIG. 7 is a table illustrating a data arrangement structure for detecting a second transmitted signal in CNN-based MIMO detection technology according to an embodiment of the present invention.

Referring to FIG. 5, it can be seen that the process for estimating a single transmitted signal using multiple received signals is illustrated. In this case, the CNN signal estimation unit 123 of the signal estimation unit 120 may learn the received signals using a Convolutional Neural Network (CNN) architecture. As illustrated in FIG. 5, it can be seen that a regulation function may be identical to the above-described regulation function.

However, the data arrangement unit 122 of the signal estimation unit 120 may arrange the signals, which are received during a total of V time intervals, in the form of a V×2·R-dimensional matrix so that the received signals are suitable for a CNN architecture through an input signal sort function after regularization has been performed.

Thereafter, the CNN signal estimation unit 123 of the signal estimation unit 120 may detect a signal using the CNN architecture.

Referring to FIG. 6, the signal arrangement process and the CNN architecture are illustrated.

The data arrangement unit 122 may arrange regularized data in the form of a V×2·R-dimensional matrix by grouping the regularized data into a unit of signals received during a total of V time intervals.

Thereafter, the CNN signal estimation unit 123 may perform the operation of estimating a T×1-dimensional transmitted signal that is transmitted during a single transmission time interval using the signals received during the V time intervals.

Here, the CNN signal estimation unit 123 may perform typical CNN operations, and the size of a filter and the number V of reception time intervals may be changed in various manners depending on the communication environment. When the above-described CNN-based deep learning detection is performed, the signal that is transmitted during a single transmission interval is estimated using signals that are received during V time intervals, and thus the performance of signal detection may be improved. Furthermore, in order to detect a transmitted signal that is transmitted during a second transmission time interval, the data arrangement unit 122 may arrange second V×2·R-dimensional input data, as illustrated in FIG. 7, and the CNN signal estimation unit 123 may perform a CNN operation using the arranged second input data.

Figure 8:
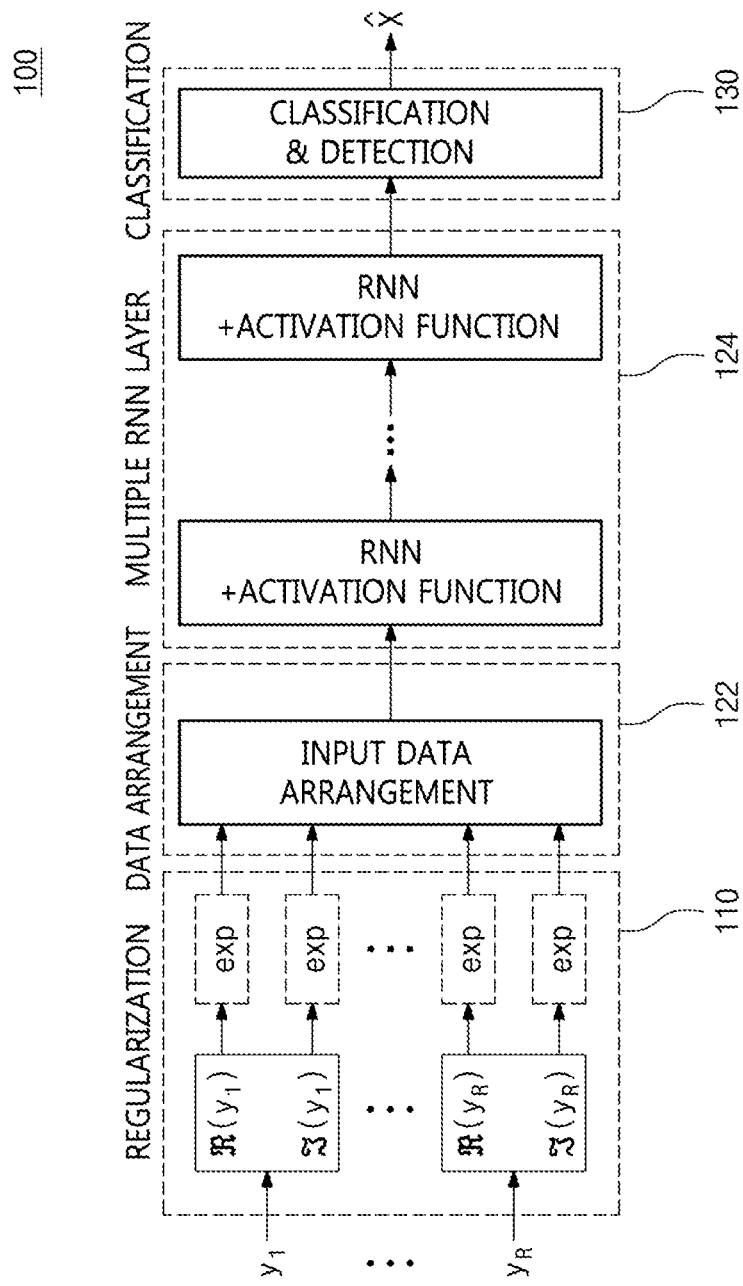
FIG. 8 is a block diagram illustrating a signal estimation unit for performing Recurrent Neural Network (RNN)-based signal estimation according to an embodiment of the present invention.
Figure 9:
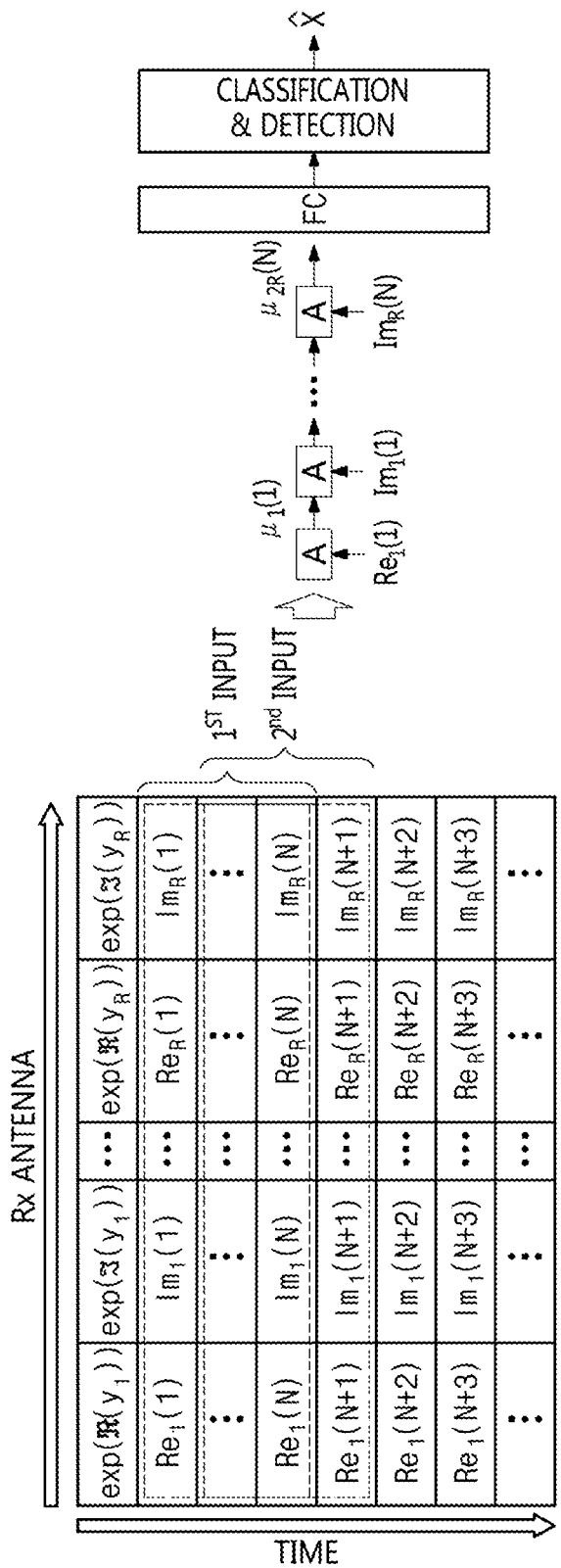
FIG. 9 is a diagram illustrating a data arrangement and signal detection process in RNN-based MIMO detection technology according to an embodiment of the present invention.

FIG. 8 is a block diagram illustrating a signal estimation unit for performing Recurrent Neural Network (RNN)-based signal estimation according to an embodiment of the present invention. FIG. 9 is a diagram illustrating a data arrangement and signal detection process in RNN-based MIMO detection technology according to an embodiment of the present invention.

Referring to FIG. 8, it can be seen that an RNN-based signal detection process is illustrated. The RNN may provide greatly superior performance from the aspect of estimating and classifying time-varying signals. Signals that have passed through a multi-path channel or signals in which time/frequency offset has occurred may be assumed to be time-varying signals because previous signals continuously influence subsequent signals. In this case, when the RNN is used, detection performance may be greatly improved.

As illustrated in FIG. 8, the data arrangement unit 122 of the signal estimation unit 120 may arrange input signals to be suitable for the RNN. The data arrangement unit 122 may arrange the input signals based on a preset rule. Thereafter, the RNN signal estimation unit 124 may perform signal training and signal estimation through RNN operations, and the signal detection unit 130 may detect a signal.

Referring to FIG. 9, it can be seen that, in order to detect a single transmitted signal, signals received during a total of N time intervals are considered, and this detection procedure is sequentially performed. Further, since an RNN architecture also adopts a structure in which a signal is detected by sequentially utilizing received signals, a detection procedure in the RNN architecture is similar to that in the CNN architecture. However, the detection procedure in the RNN architecture detects a signal based on time variation, unlike the CNN architecture, and thus the RNN architecture may provide excellent signal detection performance compared to the CNN architecture.

Here, the signal estimation unit 120 may arrange the received signals in the form of a matrix using a sort function for a neural network corresponding to any one of a fully-connected (FC) neural network technique, a CNN technique, and an RNN technique for machine learning.

The signal estimation unit 120 may arrange the regularized signals in the form of a matrix by grouping the regularized signals into a unit of signals received during a first preset time, and may estimate the signals received during a second preset time corresponding to the first preset time.

Figure 10:
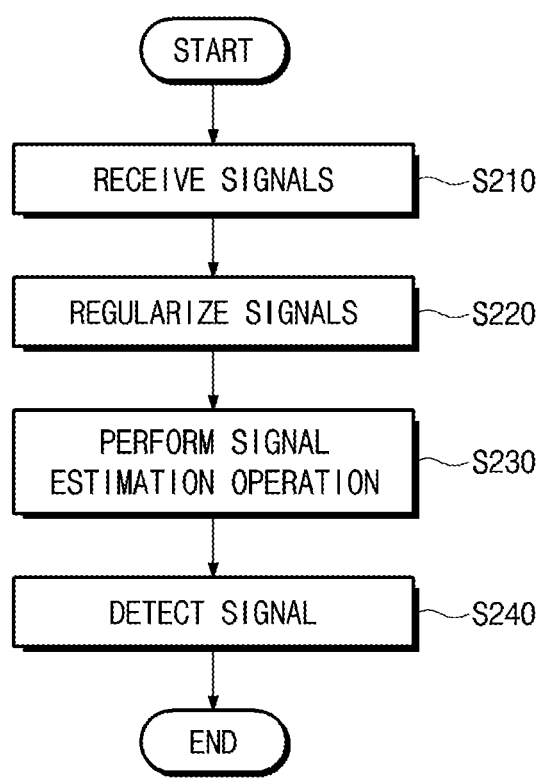
FIG. 10 is an operation flowchart illustrating a signal detection process in a signal-multiplexing method based on machine learning according to an embodiment of the present invention.

FIG. 10 is an operation flowchart illustrating a signal detection process in a signal-multiplexing method based on machine learning according to an embodiment of the present invention.

Referring to FIG. 10, in the signal detection process in the signal-multiplexing method based on machine learning (hereinafter also referred to as "machine learning-based signal-multiplexing method") according to the embodiment of the present invention, signals may be received at step S210.

At step S210, the signals, which have been transmitted through T transmission antennas, may be received through R reception antennas, as shown in Equation (2) and FIG. 2.

Next, in the signal detection process in the machine learning-based signal-multiplexing method according to the embodiment of the present invention, the signals may be regularized at step S220.

That is, at step S220, the received signals may be regularized based on a preset rule for machine learning.

Here, at step S220, the signals received through the reception antennas may be regularized based on the specific rule in conformity with a machine learning (deep-learning) structure.

Here, at step S220, the function of the above-described regularization unit 110 may be performed.

Next, in the signal detection process in the machine learning-based signal-multiplexing method according to the embodiment of the present invention, signals may be learned and estimated at step S230.

That is, at step S230, machine learning may be performed on the regularized received signals, and a transmitted signal corresponding to the regularized received signals may be estimated using the machine-learned signals.

Here, at step S230, the signals transmitted/received during a specific period may be compared with each other, and thus training for machine learning-based deep learning may be conducted through the signal training unit 140.

At step S230, machine learning may be performed through the signal training unit 140 using only the transmitted and received signals without requiring channel information or SNR information.

Here, at step S230, the regularized received signals may be used as input signals for deep learning, and the transmitted signal may be used as a reference value (e.g. a correct answer label) to be used for training.

At step S230, Fully-Connected Network (FCN)-based signal estimation may be performed.

At step S230, Convolutional Neural Network (CNN)-based signal estimation may be performed.

At step S230, Recurrent Neural Network (RNN)-based signal estimation may be performed.

At step S230, the signals, which are received during a total of V time intervals, may be arranged in the form of a V×2·R-dimensional matrix so that the received signals are suitable for a CNN architecture through an input signal sort function after regularization has been performed.

Also, at step S230, the signals, which are received during a total of V time intervals, may be arranged in the form of a V×2·R-dimensional matrix so that the received signals are suitable for an RNN architecture through an input signal sort function after regularization has been performed.

Here, at step S230, the function of the above-described regularization unit 120 may be performed.

Next, in the signal detection process in the machine learning-based signal-multiplexing method according to the embodiment of the present invention, a signal may be detected at step S240.

That is, at step S240, the transmitted signal may be detected using the estimated signal.

Here, at step S240, the transmitted signal may be detected from the regularized received signals using a value obtained by estimating the transmitted signal.

Here, at step S240, the function of the above-described signal detection unit 130 may be performed.

Figure 11:
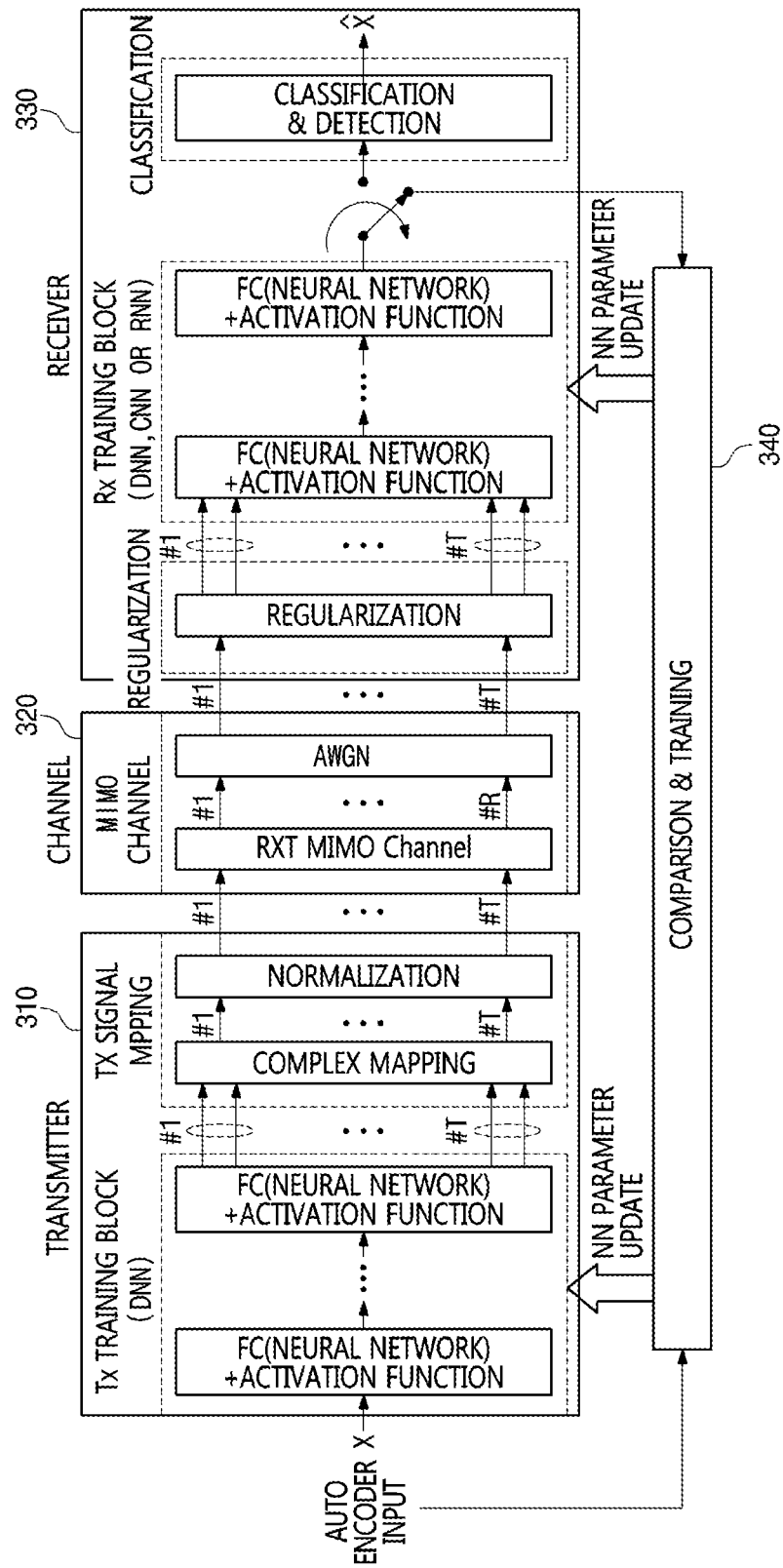
FIG. 11 is a block diagram illustrating a signal-multiplexing apparatus based on machine learning using an autoencoder according to an embodiment of the present invention.
Figure 12:
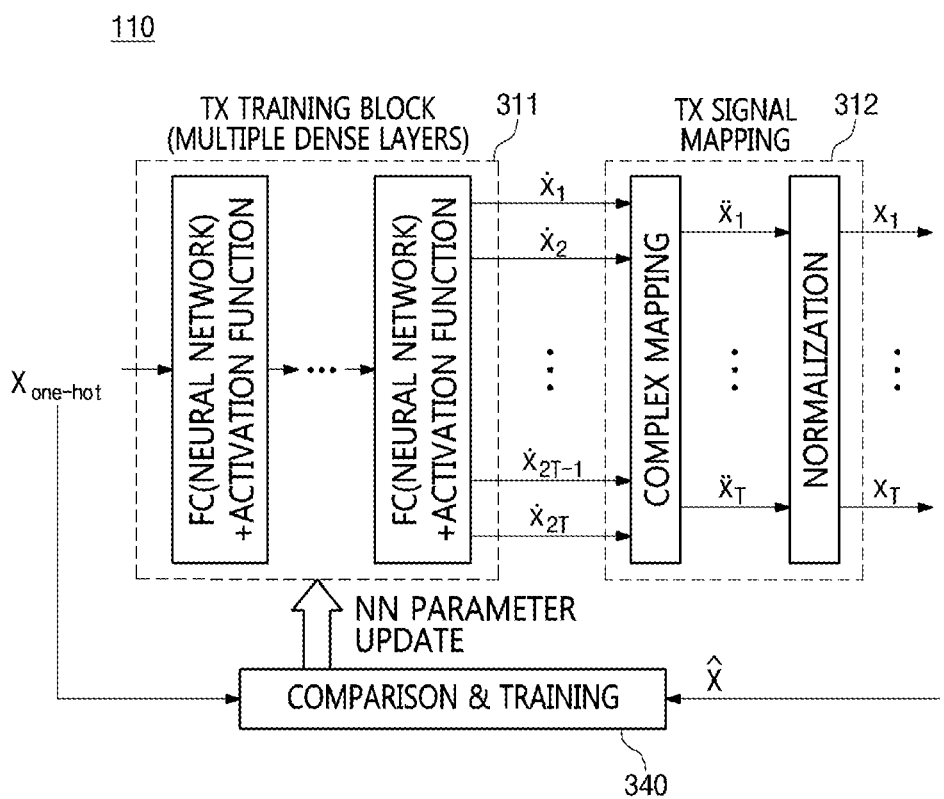
FIG. 12 is a block diagram illustrating the transmitter of the signal-multiplexing apparatus based on machine learning according to an embodiment of the present invention.
Figure 13:
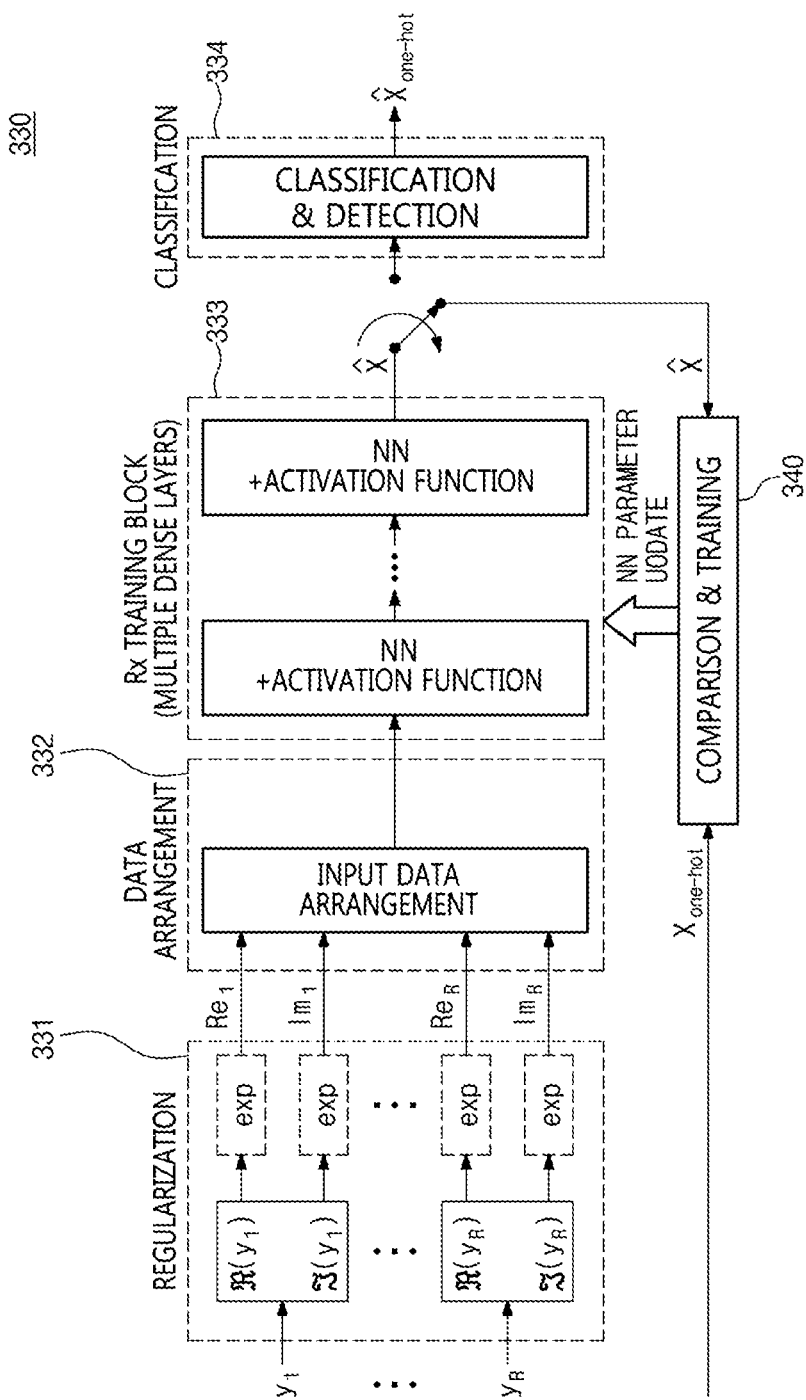
FIG. 13 is a block diagram illustrating the receiver of the signal-multiplexing apparatus based on machine learning according to an embodiment of the present invention.

FIG. 11 is a block diagram illustrating a signal-multiplexing apparatus based on machine learning using an autoencoder according to an embodiment of the present invention. FIG. 12 is a block diagram illustrating the transmitter of the signal-multiplexing apparatus based on machine learning according to an embodiment of the present invention. FIG. 13 is a block diagram illustrating the receiver of the signal-multiplexing apparatus based on machine learning according to an embodiment of the present invention.

Referring to FIG. 11, the machine learning-based signal-multiplexing apparatus using an auto-encoder according to the embodiment of the present invention may include a transmitter 310 for performing a multi-signal generation and mapping function and a receiver 330 for detecting and demodulating signals received through a multi-transmission/reception channel 320.

The multi-transmission/reception channel 320 may be present between the transmitter 310 and the receiver 330. As illustrated in FIG. 11, an MIMO environment including T transmission antennas and R reception antennas may be taken into consideration.

Referring to FIG. 12, the transmitter 310 may include a signal training unit (signal-training block) 311 including a Deep Neural Network (DNN) function and a signal mapping unit 312 for mapping trained data to the transmitted signal of a wireless communication system so that the trained data is suitable for the transmitted signal.

The signal-training unit 311 may include multiple neural networks implemented as fully-connected networks (FCN) and activation function blocks.

Here, the signal-training unit 311 may perform an activation function operation so as to process the output of each neural network as a nonlinear function.

Here, as the activation function, any of various existing nonlinear functions may be used.

For example, as the activation function, any of existing functions, such as ReLU, tanh, and sigmoid, may be used.

Here, the final output of the signal-training unit 311 may have the form of a 2·T×1 vector.

The signal mapping unit 312 may change the received output to I/Q data signal suitable for the transmitted signal of the wireless communication system by inputting the received output to a complex mapping block.

Here, the I/Q data may be mapped using two neighboring input values.

For example, the first output of the complex mapping block may be generated using first and second input data of the complex mapping block. Through the above-described method, 2·T×1-dimensional real number-type input data may be changed to T×1-dimensional complex data. The complex data changed in this way may be input to a normalization block.

The normalization block may control the power of the transmitted signal so that the power of the transmitted signal becomes 1, or may adjust the power of each input signal to the transmission power at which a specific wireless communication system desires to perform transmission.

The signals being subjected to power normalization may be input to R reception antennas through a Multiple-Input Multiple-Output (MIMO) channel.

Referring to FIG. 13, the received signals may be regularized by a regularization unit 331 based on a special rule in conformity with the machine-learning block structure of the receiver 330. The regularized received signals may be input to the signal training unit (signal-training block) 333 of the receiver 330.

results of calculation of the difference, train the transmitted signal using the machine-learning technique in which the machine-learning coefficients are updated, and estimate the transmitted signal.

Here, when it is determined that the difference is less than or equal to a preset value, the training unit 340 may stop the training of the transmitted signal and the estimation of the transmitted signal, and may perform communication for multiple signals.

Referring back to FIG. 12, the input of the auto-encoder has the form of a one-hot vector. A one-hot vector may correspond to the output value of one-hot encoding, which is bit encoding that assigns '1' only to a bit at a meaningful position and assigns '0' to the remaining bits in consideration of the number of cases of all signals capable of being transmitted. The one-hot vector for transmission in a MIMO system having two antennas, each transmitting information corresponding to 2 bits, may be shown in the following Table 1.

TABLE 1

| Bits for $1^{st}$ Tx | | Bits for $2^{nd}$ Tx | | One-hot vectors | | | | | | | | | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 0 | 0 | 0 | 0 | 0 | 1 | 0 | 0 |
| 0 | 0 | 1 | 1 | 0 | 0 | 0 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 0 | 0 | 0 | 0 | 1 | 0 | 0 | 0 | 0 | 0 |
| 0 | 1 | 0 | 1 | 0 | 0 | 0 | 0 | 0 | 0 | 0 | 0 | 0 | 1 | 0 | 0 | 0 | 0 | 0 | 0 |
| 0 | 1 | 1 | 0 | 0 | 0 | 0 | 0 | 0 | 0 | 0 | 0 | 1 | 0 | 0 | 0 | 0 | 0 | 0 | 0 |
| 0 | 1 | 1 | 1 | 0 | 0 | 0 | 0 | 0 | 0 | 0 | 1 | 0 | 0 | 0 | 0 | 0 | 0 | 0 | 0 |
| 1 | 0 | 0 | 0 | 0 | 0 | 0 | 0 | 0 | 0 | 1 | 0 | 0 | 0 | 0 | 0 | 0 | 0 | 0 | 0 |
| 1 | 0 | 0 | 1 | 0 | 0 | 0 | 0 | 0 | 1 | 0 | 0 | 0 | 0 | 0 | 0 | 0 | 0 | 0 | 0 |
| 1 | 0 | 1 | 0 | 0 | 0 | 0 | 0 | 1 | 0 | 0 | 0 | 0 | 0 | 0 | 0 | 0 | 0 | 0 | 0 |
| 1 | 0 | 1 | 1 | 0 | 0 | 0 | 1 | 0 | 0 | 0 | 0 | 0 | 0 | 0 | 0 | 0 | 0 | 0 | 0 |
| 1 | 1 | 0 | 0 | 0 | 0 | 1 | 0 | 0 | 0 | 0 | 0 | 0 | 0 | 0 | 0 | 0 | 0 | 0 | 0 |
| 1 | 1 | 0 | 1 | 0 | 1 | 0 | 0 | 0 | 0 | 0 | 0 | 0 | 0 | 0 | 0 | 0 | 0 | 0 | 0 |
| 1 | 1 | 1 | 0 | 1 | 0 | 0 | 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 | 0 | 0 |

The signal training unit 333 of the receiver 330 may include multiple neural networks implemented as fully-connected networks (FCNs) and activation function blocks.

The signal training unit 333 may perform an activation function operation so as to process the output of each neuron of a neural network as a nonlinear function.

Here, as the activation function, any of various existing nonlinear functions may be used.

The output of the signal training unit 333 of the receiver 330 may be demodulated and detected as the transmitted signal after undergoing a specific operation.

The signal training unit 333 may calculate the difference between the output signal of the receiver 330 and the transmitted signal corresponding thereto through a training unit (comparison and training unit) 340, and may update the coefficients of all training blocks present in the transmitter/receiver so as to reduce the corresponding difference.

After training has been completed, signals that are not known by the receiver 330 may be input to the signal training unit 333, and actual communication for estimating a transmitted signal may be performed.

Here, the signal training unit 333 may estimate the transmitted signal by applying the machine-learning technique to the vector regularized such that the vector is separated into a real part and an imaginary part.

The training unit 340 may update the machine-learning coefficients of the machine-learning technique using the The input value of the one-hot vector, such as that shown in Table 1, may be applied to the signal training unit 311 of the transmitter based on machine learning that uses a Deep Neural Network (DNN).

The signal training unit 311 may include multiple fully-connected neural networks (FCNs) and activation function blocks. The output of each of the fully-connected neural networks may be input to an activation function block having nonlinear characteristics, and a value may be output through a nonlinear operation.

Here, as the activation function, any of various existing functions may be used. For example, as the activation function, any of existing functions, such as ReLU, tanh, and sigmoid, may be used. After passing through multiple fully-connected neural networks and activation functions, the output of the signal training unit 311 may be represented by the following Equation (6):

$$\dot{x} = F_{\mu t}(x_{one\text{-}hot}) = [\pm \dot{x}_1 \dot{x}_2 \ldots \dot{x}_{2\cdot T\text{-}1} \dot{x}_{2\cdot T}]^T \quad (6)$$

$F_{\mu t}(\bullet)$ may be a machine learning-based deep-learning function that is briefly represented, and the coefficient of the function used at that time may be represented by μt. Further, the output signal, that is, ẋ may be a signal vector generated through a machine learning process having 2·T elements. The signal generated in this way may be input to a complex mapping block. The complex mapping block may map two neighboring values, among pieces of input data, to I/Q data (real term and imaginary term). The above-described operation may be represented by the following Equation (7).

$$\ddot{x}=[\ddot{x}_1 \ddot{x}_2 \ldots \ddot{x}_t \ldots \ddot{x}_T]$$

$$=[\ddot{x}_1+j\cdot\ddot{x}_2, \ddot{x}_3+j\cdot\ddot{x}_4, \ldots, \ddot{x}_{2\cdot t-1}+j\cdot\ddot{x}_{2\cdot t}, \ldots, \ddot{x}_{2\cdot T-1}+j\cdot\ddot{x}_{2\cdot T}]^T \quad (7)$$

In Equation (7), $\ddot{x}_t$ may be the t-th output of the complex mapping block, and $\ddot{x}_{2\cdot t-1}$ and $\ddot{x}_{2\cdot t}$, which are input values of the corresponding block, may have a value of $\ddot{x}_{2\cdot t-1}+\ddot{x}_{2\cdot t}$ which is configured in an I/Q format. As described above, the output of the complex mapping block may be input to a normalization block. The normalization block may perform the same operation as the operation of setting the power of transmission symbols in a baseband to '1'. By means of this operation, the total power of T symbols that are transmitted may be set to '1'.

$$x = \frac{x}{\sqrt{\sum_{t=1}^{T} |\ddot{x}_t|^2}} \quad (8)$$

Because the operation in Equation (8) is an example of the most general multi-transmission/reception scheme, the normalization block may also use an additional normalization technique for causing the total power of T symbols that are transmitted to be '1', unlike the most general multi-transmission/reception scheme, or may set various normalization techniques suitable for a communication system and a communication environment.

The signals (symbols) transmitted through the above-described procedure may be input to the receiver 330 having R reception antennas after passing through the MIMO channel and the AWGN channel. The process in which the T transmission symbols pass through the channel and are input to the R receivers may be represented by the following Equation (9):

$$Re_r=\exp(\Re(y_r))$$

$$Im_r=\exp(\Im(y_r))$$

$$N_y=[Re_1 Im_1 Re_2 Im_2 \ldots Re_R Im_R] \quad (9)$$

In Equation (9), it can be seen that $\Re(y_r)$ denotes the real part of an r-th received signal $y_r$, and $\Im(y_r)$ denotes the imaginary part of the r-th received signal $y_r$. As shown in Equation (9), a negative term is removed from the signal separated into the real part and the imaginary part through an exponential operation, and the resulting signal may then be input to the signal-training unit 311. $N_y$ of Equation (9) may indicate a regularized input value that is applied to the training block.

In this case, the signal-training unit 311 may perform a machine learning-based training operation. Here, the operation corresponding to each neuron may be represented by a fully-connected (FC) function.

Here, the signal-training unit 311 may perform an activation function operation so as to process the output of each neuron as a nonlinear function.

As the activation function, any of various existing functions may be used. For example, as the activation function, any of existing functions, such as ReLU, tanh, and sigmoid, may be used. This procedure may be represented by the following Equation (10):

$$\hat{x}=F_{\mu r}(N_y) \quad (10)$$

In Equation (10), it can be seen that $F_{\mu r}(\cdot)$ is a briefly represented deep-learning function, and the coefficient of the function that is used at this time is represented by $\mu r$. Also, the output signal, that is, $\hat{x}$, may correspond to a signal estimated through the machine-learning procedure.

Here, the signal-training unit 311 may estimate the transmitted one-hot vector based on an operation such as that shown in Equation (10).

As illustrated in FIG. 12, the signal transmission unit 311 may perform training so that, during a specific training period, the estimated output value $\hat{x}$ is compared with the transmitted value $x_{one-hot}$ through the training unit 340 and so that the difference therebetween is gradually decreased. Generally, such a difference may be referred to as a "cost or cost function attributable to training". For calculation of the cost function, any of a Mean Square Error (MSE) scheme and a cross entropy scheme may be used. In the autoencoder-based multi-transmission/reception system, the values of $\mu t$ and $\mu r$, which are the coefficients of the machine-learning function, may be updated so that the calculated cost is decreased. As the scheme for updating the coefficients, a typical Stochastic Gradient Descent (SGD) scheme or an Adam optimization scheme may be used.

Since the signal-training unit 311 of the transmitter and the signal-training unit 333 of the receiver perform training both in the transmitter and the receiver based on the difference calculated by the training unit 340, the entire system may be effectively trained by performing not only signal modulation suitable for a given wireless MIMO channel but also demodulation. Therefore, since the machine learning-based signal-multiplexing apparatus according to an embodiment of the present invention may update the training units (training blocks) of the transmitter 310 and the receiver 330 together in conformity with the channel characteristics, a transmitted signal may be generated in a format suitable for a channel environment, and thus detection and demodulation of multiple received signals may be easily performed. The update of $\mu t$ and $\mu_r$, which are the coefficients of the machine-learning function, may be completed after repetitive training corresponding to a specific number of repetitions has been performed. Alternatively, if an error value less than or equal to a specific reference value is derived, training may be stopped, and actual communication may be performed.

Further, when the receiver 330 receives signals through a multi-channel structure or when a time/frequency offset occurs, previously transmitted symbols may continuously influence subsequently transmitted symbols.

Therefore, when the transmitted signal is estimated by means of a signal received at one time point, the accuracy of the estimated signal may be decreased.

Therefore, an operation for detecting a single transmitted signal using multiple received signals is required, wherein a specific arrangement structure may be used so that the use of multiple received signals is facilitated so as to detect a single signal.

As illustrated in FIG. 13, a data arrangement unit (input data arrangement) 332 may arrange pieces of received data so that a transmitted signal can be detected using signals received during multiple reception time intervals. The data arrangement unit 332 may design a received signal-training block, such as a CNN training block or an RNN training block, through such arrangement.

Figure 14:
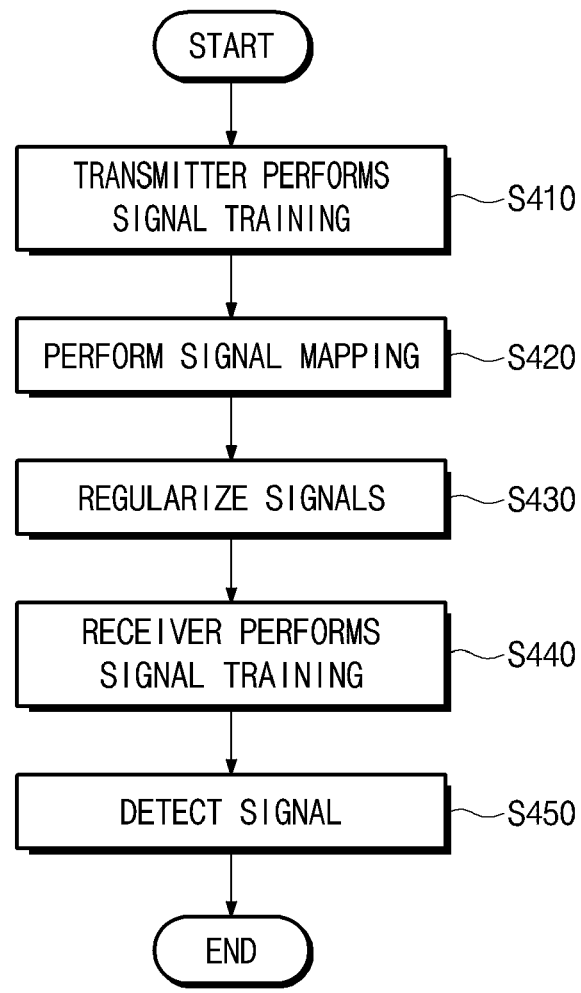
FIG. 14 is an operation flowchart illustrating a signal-multiplexing method based on machine learning according to an embodiment of the present invention.

FIG. 14 is an operation flowchart illustrating a signal-multiplexing method based on machine learning according to an embodiment of the present invention.

Referring to FIG. 14, in the machine learning-based signal-multiplexing method according to an embodiment of the present invention, the transmitter 310 trains a transmitted signal at step S410.

The transmitter 310 may include multiple neural networks implemented as Fully-Connected Networks (FCNs) and activation function blocks.

Here, at step S410, an activation function operation may be performed so as to process the output of each neural network as a nonlinear function.

Here, as the activation function, any of various existing nonlinear functions may be used.

For example, at step S410, any of existing functions, such as ReLU, tanh, and sigmoid, may be used as the activation function.

At step S410, data having a 2·T×1 vector form may be output.

Also, it can be seen that the input of the autoencoder according to the embodiment of the present invention has the form of a one-hot vector. A one-hot vector may correspond to the output value of one-hot encoding, which is bit encoding that assigns '1' only to a bit at a meaningful position and assigns '0' to the remaining bits in consideration of the number of cases of all signals capable of being transmitted. The one-hot vector for transmission in a MIMO system having two antennas, each transmitting information corresponding to 2 bits, may be shown in the above Table 1.

Here, at step S410, the input value of the one-hot vector, such as that shown in Table 1, may be applied to the signal-training unit 311 of the transmitter based on machine learning that uses a Deep Neural Network (DNN).

At step S410, the signal may be trained using multiple Fully-Connected Networks (FCNs) and activation function blocks. The output of each of the FCNs may be input to the activation function block having nonlinear characteristics, and a value may be output through a nonlinear operation.

Here, as the activation function, any of various existing functions may be used. For example, as the activation function, any of existing functions, such as ReLU, tanh, and sigmoid, may be used. Here, at step S410, after passing through multiple FCNs and activation functions, the output of the signal-training unit 311 may be represented by Equation (6).

$F_\mu(\bullet)$ denotes a deep-learning-based machine-learning function, which is briefly represented, and the coefficient of the function used at this time may be represented by $\mu$. Further, $\hat{x}$, which is the output signal, may be the signal estimated through the machine-learning procedure.

Next, the machine learning-based signal-multiplexing method according to an embodiment of the present invention may perform signal mapping at step S420.

At step S420, the received output may be input to a complex mapping block and may then be changed to I/Q data suitable for the transmitted signal of a wireless communication system.

Here, the I/Q data may be mapped using two neighboring input values.

Here, at step S420, the signal may be input to the complex mapping block. The complex mapping block may map two neighboring values, among pieces of input data, to I/Q data (real term and imaginary term). The above-described operation may be represented by Equation (7).

In Equation (7), $\ddot{x}_t$ may be the t-th output of the complex mapping block, and $\ddot{x}_{2 \cdot t-1}$ and $\ddot{x}_{2 \cdot t}$, which are input values of the corresponding block, may have a value of $\ddot{x}_{2 \cdot t-1} + j \cdot \ddot{x}_{2 \cdot t}$ which is configured in an I/Q format.

For example, at step S420, the first output of the complex mapping block may be generated using the first and second input data of the complex mapping block. Through the above-described method, at step S420, 2·T×1-dimensional real number-type input data may be changed to Tx 1-dimensional complex data.

Here, at step S420, the output of the complex mapping block corresponding to the complex data, changed as described above, may be input to a normalization block.

Here, at step S420, the normalization block may perform the same operation as the operation of setting the power of transmission symbols in a baseband to '1'. By means of this operation, the total power of T symbols that are transmitted may be set to '1'.

Because the operation in Equation (8) is an example of the most general multi-transmission/reception scheme, the normalization block may also use an additional normalization technique for causing the total power of T symbols that are transmitted to be '1', unlike the most general multi-transmission/reception scheme, or may set various normalization techniques suitable for a communication system and a communication environment.

At step S420, the normalization block may cause the power of the transmitted signal to be '1' or may adjust the power of each input signal to the transmission power at which a specific wireless communication system desires to perform transmission.

Here, at step S420, the signals being subjected to power normalization may be input to R reception antennas through a MIMO channel.

Next, the machine learning-based signal-multiplexing method according to an embodiment of the present invention may regularize the signals at step S430.

That is, at step S430, the signals (symbols) transmitted through the above-described procedure may be input to the receiver 330 having R reception antennas after passing through the MIMO channel and the AWGN channel. Here, the process in which the T transmission symbols pass through the channel and are input to the R receivers at step S420, may be represented by Equation (9).

In Equation (9), it can be seen that $\Re(y_r)$ denotes the real part of an r-th received signal $y_r$, and $\Im(y_r)$ denotes the imaginary part of the r-th received signal $y_r$.

Here, at step S430, as shown in Equation (9), a negative term is removed from the signal separated into the real part and the imaginary part through an exponential operation, and the resulting signal may then be input to the signal-training unit 331 of the receiver 330. $N_y$ of Equation (9) may indicate a regularized input value that is applied to the training block.

At step S440, a machine learning-based training operation may be performed. Here, the operation corresponding to each neuron may be represented by a fully-connected (FC) function.

At step S440, an activation function operation may be performed so as to process the output of each neuron as a nonlinear function.

As the activation function, any of various existing functions may be used. For example, as the activation function, any of existing functions, such as ReLU, tanh, and sigmoid, may be used. This procedure may be represented by Equation (10).

In Equation (10), it can be seen that $F_{\mu r}(\bullet)$ is a briefly represented deep-learning function, and the coefficient of the function that is used at this time is represented by $\mu r$. Also, the output signal, that is, $\hat{x}$, may correspond to a signal estimated through the machine-learning procedure.

Here, at step S440, the transmitted one-hot vector may be estimated based on an operation such as that shown in Equation (10).

As illustrated in FIG. 12, at step S440, training may be performed so that, during a specific training period, the estimated output value $\hat{x}$ is compared with the transmitted value $x_{one-hot}$ through the training unit 340 and so that the difference therebetween is gradually decreased. Generally, such a difference may be referred to as a "cost or cost function attributable to training". For calculation of the cost function, any of a Mean Square Error (MSE) scheme and a cross entropy scheme may be used. In the autoencoder-based multi-transmission/reception system, the values of µt and µr, which are the coefficients of the machine-learning function, may be updated so that the calculated cost is decreased. As the scheme for updating the coefficients, a typical Stochastic Gradient Descent (SGD) scheme or an Adam optimization scheme may be used.

Since the signal-training unit 311 of the transmitter at step S410 and the signal-training unit 333 of the receiver at step S440 perform training both in the transmitter and the receiver based on the difference calculated by the training unit 340, the entire system may be effectively trained by performing not only signal modulation suitable for a given wireless MIMO channel but also demodulation. Therefore, since the machine learning-based signal-multiplexing apparatus according to an embodiment of the present invention may update the training units (training blocks) of the transmitter 310 and the receiver 330 together in conformity with the channel characteristics, a transmitted signal may be generated in a format suitable for a channel environment, and thus detection and demodulation of multiple received signals may be easily performed. The update of µt and µr, which are the coefficients of the machine-learning function, may be completed after repetitive training corresponding to a specific number of repetitions has been performed. Alternatively, if an error value less than or equal to a specific reference value is derived, training may be stopped, and actual communication may be performed.

Further, when the receiver 330 receives the signals through a multi-channel structure or when a time/frequency offset occurs, previously transmitted symbols may continuously influence subsequently transmitted symbols.

Then, when the transmitted signal is estimated by means of a signal received at one time point, the accuracy of the estimated signal may be decreased.

Therefore, an operation for detecting a single transmitted signal using multiple received signals is required, wherein a specific arrangement structure may be used so that the use of multiple received signals is facilitated so as to detect a single signal.

As illustrated in FIG. 13, at step S440, a data arrangement unit (input data arrangement) 332 may arrange pieces of received data so that a transmitted signal can be detected using signals received during multiple reception time intervals. At step S440, a received signal-training block, such as a CNN training block or an RNN training block, may be designed through such arrangement.

Here, at step S440, the received signals may be regularized by the regularization unit 331 based on a special rule in conformity with the machine-learning block structure of the receiver 330.

At step S440, the regularized received signals may be input to the signal-training unit 333 of the receiver 330 so as to perform signal detection.

The signal training unit 333 of the receiver 330 may include multiple neural networks implemented as Fully-Connected Networks (FCNs) and activation function blocks.

Here, at step S440, an activation function operation may be performed so as to process the output of each neuron as a nonlinear function.

Here, as the activation function, any of various existing functions may be used.

At step S440, the transmitted signal may be estimated by applying the machine-learning technique to the vector regularized such that the vector is separated into a real part and an imaginary part.

Further, the machine learning-based signal-multiplexing method according to the embodiment of the present invention may detect a signal at step S450.

Here, at step S450, the output of the signal-training unit 333 of the receiver 330 may be demodulated and detected as the transmitted signal after undergoing a specific operation.

Here, at step S450, the difference between the output signal of the receiver 330 and the transmitted signal corresponding thereto may be calculated through the training unit 340, and the coefficients of all training blocks present in the transmitter/receiver may be updated so as to reduce the corresponding difference.

Here, at step S450, the machine-learning coefficients of the machine learning technique may be updated using the results of calculation of the difference, the transmitted signal may be trained using the machine-learning technique in which the machine-learning coefficients are updated, and the transmitted signal may be estimated.

At step S450, when it is determined that the difference is less than or equal to a preset value, the training and the estimation of the transmitted signal may be stopped, and communication for multiple signals may be performed.

Here, at step S450, when the training is terminated, signals that are not known by the receiver 330 may be input, and then actual communication for estimating a transmitted signal may be performed.

Figure 15:
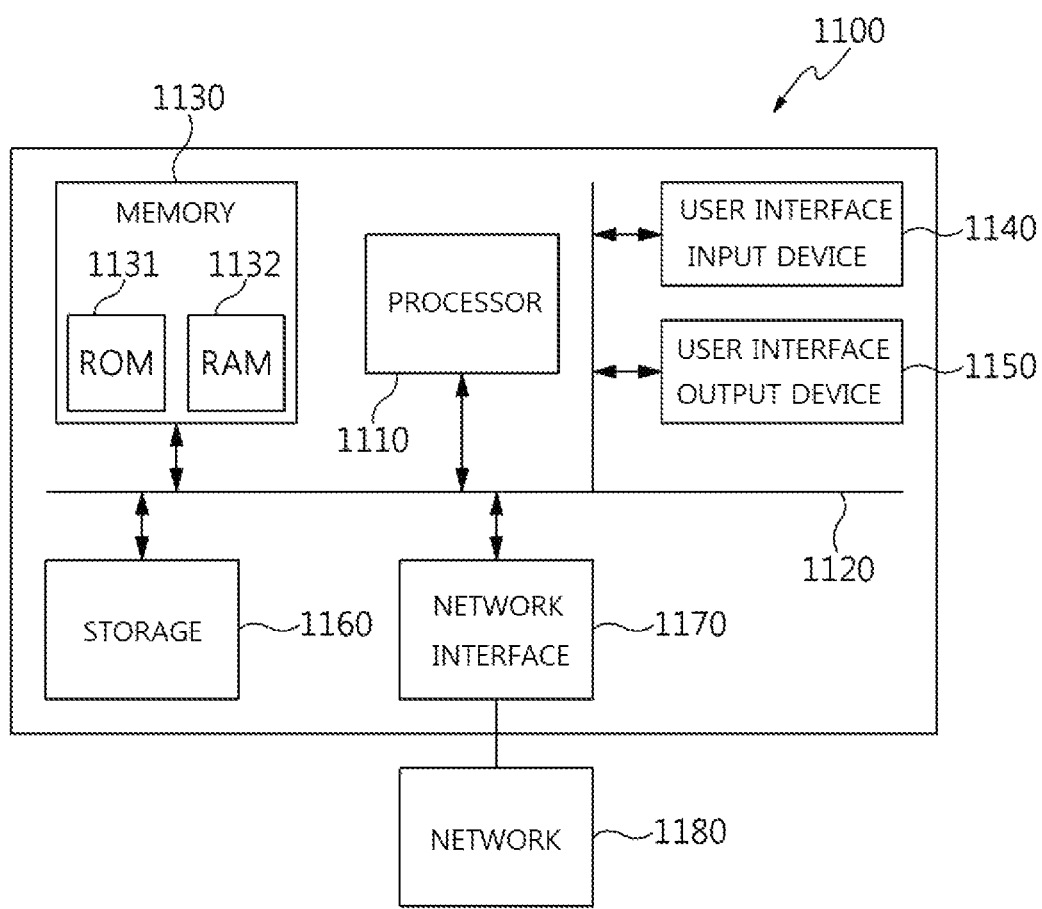
FIG. 15 is a diagram illustrating a computer system according to an embodiment of the present invention.

FIG. 15 is a diagram illustrating a computer system according to an embodiment of the present invention.

Referring to FIG. 15, the signal-multiplexing apparatus based on machine learning according to an embodiment of the present invention may be implemented in a computer system 1100 such as a computer-readable storage medium. As shown in FIG. 15, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Here, the computer system 1100 may include an execution memory for storing at least one program that is executed by the at least one processor 1110, wherein the at least one program may train a transmitted signal using a machine-learning technique, perform complex mapping for transmitting the transmitted signal as multiple signals, receive the multiple signals, regularize the multiple signals based on a preset rule corresponding to the machine-learning technique, output an estimated value for the transmitted signal by training the regularized multiple signals using the machine-learning technique, calculate the difference between the transmitted signal and the estimated value for the transmitted signal, and detect the transmitted signal from an output value when the difference is less than or equal to a preset value.

Here, the at least one program may receive the output value of encoding, which is bit encoding that assigns a bit at a position where the number of cases of signals capable of being transmitted is taken into consideration, and may train the output value of the encoding as the transmitted signal.

Here, the at least one program may perform training based on machine learning by inputting the output value of the encoding to a predefined function having nonlinear characteristics.

Here, the at least one program may perform complex mapping by mapping the vector value of the transmitted signal to data having a real part and an imaginary part.

Here, the at least one program may perform regularization so that each of the multiple signals is separated into a real part and an imaginary part.

Here, the at least one program may estimate the transmitted signal by applying the machine-learning technique to the vector regularized such that the vector is separated into a real part and an imaginary part.

Here, the at least one program may update the machine-learning coefficients of the machine-learning technique using the results of calculating the difference, train the transmitted signal using the machine-learning technique in which the machine-learning coefficients are updated, and estimate the transmitted signal.

Here, the at least one program may be configured to, when it is determined that the difference is less than or equal to a preset value, stop training and estimation of the transmitted signal, and perform communication of the multiple signals.

Further, the at least one program may regularize the received signals based on a preset rule for machine learning, perform machine learning on the regularized received signals, estimate a transmitted signal for the regularized received signals using the machine-learned signals, and detect the transmitted signal from the regularized received signals using the estimated value for the transmitted signal.

Here, the at least one program may regularize the received signals so that each received signal is separated into a real part and an imaginary part.

Here, the technique used for machine learning may correspond to any one of a fully-connected neural network technique, a convolutional neural network (CNN) technique, and a recurrent neural network (RNN) technique.

Here, the at least one program may arrange received signals in the form of a matrix using a sort function for the neural-network architecture corresponding to any one of the fully-connected neural network technique, the CNN technique, and the RNN technique.

In this case, the at least one program may group the regularized signals into a unit of signals that are received during a first preset time, arrange the regularized signals in the form of a matrix, and estimate signals that are received during a second preset time corresponding to the first preset time.

The present invention may more accurately detect a signal by utilizing a detection technique having high accuracy and improve the performance of a wireless communication system by effectively cancelling signal interference, thus increasing the capacity of a system.

Further, the present invention may detect and demodulate a signal using a very simple calculation without requiring a channel estimation procedure.

Furthermore, the present invention may modulate a signal in a format suitable for a multi-channel structure, effectively detect the corresponding signal, and effectively transmit/receive multiple signals through the same channel in order to simultaneously transmit/receive multiple signals.

As described above, in the machine learning-based signal-multiplexing apparatus and method according to the present invention, the configurations and schemes in the above-described embodiments are not limitedly applied, and some or all of the above embodiments can be selectively combined and configured so that various modifications are possible.

What is claimed is:

1. A signal-multiplexing method based on machine learning, performed by a signal-multiplexing apparatus based on machine learning, the method comprising:
   training a transmitted signal using a machine-learning technique;
   performing complex mapping to transmit the transmitted signal as multiple signals;
   receiving the multiple signals and regularizing the multiple signals so that each of the multiple signals is separated into a real part and an imaginary part;
   outputting an estimated value for the transmitted signal by training the regularized multiple signals using the machine-learning technique;
   calculating a difference between the transmitted signal and the estimated value for the transmitted signal; and
   detecting the transmitted signal from the regularized multiple signals when the difference is less than or equal to a preset value.

2. The signal-multiplexing method of claim 1, wherein training the transmitted signal is configured to receive an output value of encoding, which is bit encoding performed by assigning a bit at a position where a number of cases of signals capable of being transmitted is taken into consideration, and then train the output value as the transmitted signal.

3. The signal-multiplexing method of claim 2, wherein training the transmitted signal is configured to perform training based on machine learning by inputting the output value of the encoding to a predefined function having nonlinear characteristics.

4. The signal-multiplexing method of claim 1, wherein performing the complex mapping is configured to perform complex mapping by mapping a vector value of the transmitted signal to data having a real part and an imaginary part.

5. The signal-multiplexing method of claim 1, wherein outputting the estimated value for the transmitted signal is configured to estimate the transmitted signal by applying the machine-learning technique to a vector regularized so that the vector is separated into a real part and an imaginary part.

6. The signal-multiplexing method of claim 5, wherein calculating the difference is configured to update a machine-learning coefficient of the machine-learning technique using results of calculation of the difference, train the transmitted signal using the machine-learning technique in which the machine-learning coefficient is updated, and estimate the transmitted signal.

7. The signal-multiplexing method of claim 1, wherein calculating the difference is configured to, upon determining that the difference is less than or equal to the preset value, stop training and estimation of the transmitted signal and perform communication of the multiple signals.

8. A signal-multiplexing apparatus based on machine learning, comprising:
at least one processor; and
an execution memory for storing at least one program that is executed by the at least one processor,
wherein the at least one program is configured to:
train a transmitted signal using a machine-learning technique,
perform complex mapping to transmit the transmitted signal as multiple signals,
receive the multiple signals and regularize the multiple signals so that each of the multiple signals is separated into a real part and an imaginary part,
output an estimated value for the transmitted signal by training the regularized multiple signals using the machine-learning technique,
calculate a difference between the transmitted signal and the estimated value for the transmitted signal, and
detect the transmitted signal from the regularized multiple signals when the difference is less than or equal to a preset value.

9. The signal-multiplexing apparatus of claim 8, wherein the at least one program is configured to receive an output value of encoding, which is bit encoding performed by assigning a bit at a position where a number of cases of signals capable of being transmitted is taken into consideration, and then train the output value as the transmitted signal.

10. The signal-multiplexing apparatus of claim 9, wherein the at least one program is configured to perform training based on machine learning by inputting the output value of the encoding to a predefined function having nonlinear characteristics.

11. The signal-multiplexing apparatus of claim 8, wherein the at least one program is configured to perform complex mapping by mapping a vector value of the transmitted signal to data having a real part and an imaginary part.

12. The signal-multiplexing apparatus of claim 8, wherein the at least one program is configured to estimate the transmitted signal by applying the machine-learning technique to a vector regularized so that the vector is separated into a real part and an imaginary part.

13. The signal-multiplexing apparatus of claim 12, wherein the at least one program is configured to update a machine-learning coefficient of the machine-learning technique using results of calculation of the difference, train the transmitted signal using the machine-learning technique in which the machine-learning coefficient is updated, and estimate the transmitted signal.

14. The signal-multiplexing apparatus of claim 8, wherein the at least one program is configured to, upon determining that the difference is less than or equal to the preset value, stop training and estimation of the transmitted signal and perform communication of the multiple signals.

15. A signal-multiplexing method based on machine learning, performed by a signal-multiplexing apparatus, the method comprising:
regularizing received signals so that each of the received signals is separated into a real part and an imaginary part;
performing machine learning on the regularized received signals and estimating a transmitted signal for the regularized received signals using machine-learned signals; and
detecting the transmitted signal from the regularized received signals using an estimated value for the transmitted signal,
wherein estimating the transmitted signal is configured to arrange the regularized received signals in a form of a matrix by grouping the regularized received signals into a unit of signals received during a first preset time, and to estimate signals that are received during a second preset time corresponding to the first preset time.

16. The signal-multiplexing method of claim 15, wherein estimating the transmitted signal is configured to arrange the received signals in a form of a matrix using a sort function for a neural-network architecture corresponding to any one of a fully-connected neural network technique, a convolutional neural network technique, and a recurrent neural network technique that are techniques used for the machine learning.

* * * * *